United States Patent
Fleury et al.

(10) Patent No.: US 10,435,485 B2
(45) Date of Patent: Oct. 8, 2019

(54) POLYMER MODIFIED ALONG THE CHAIN AND PROCESS FOR THE SYNTHESIS THEREOF

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Etienne Fleury, Clermont-Ferrand (FR); Julien Thuilliez, Clermont-Ferrand (FR); Jean-Michel Favrot, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 15/327,123

(22) PCT Filed: Jul. 9, 2015

(86) PCT No.: PCT/EP2015/065750
§ 371 (c)(1),
(2) Date: Jan. 18, 2017

(87) PCT Pub. No.: WO2016/012257
PCT Pub. Date: Jan. 28, 2016

(65) Prior Publication Data
US 2017/0174794 A1    Jun. 22, 2017

(30) Foreign Application Priority Data

Jul. 21, 2014 (FR) ...................... 14 57012

(51) Int. Cl.
| | | |
|---|---|---|
| *C08C 19/22* | (2006.01) | |
| *B60C 1/00* | (2006.01) | |
| *C08F 8/30* | (2006.01) | |
| *C08K 3/04* | (2006.01) | |
| *C08K 3/36* | (2006.01) | |

(52) U.S. Cl.
CPC ............... *C08C 19/22* (2013.01); *B60C 1/00* (2013.01); *C08F 8/30* (2013.01); *C08K 3/04* (2013.01); *C08K 3/36* (2013.01)

(58) Field of Classification Search
CPC .................................. C08C 19/22; C08F 8/30
See application file for complete search history.

(56) References Cited

U.S. PATENT DOCUMENTS

| | | | |
|---|---|---|---|
| 2004/0138395 A1* | 7/2004 | Bennett ................... | C08F 10/00 526/336 |
| 2010/0022725 A1 | 1/2010 | Thuilliez et al. | |
| 2013/0123418 A1 | 5/2013 | Araujo Da Silva et al. | |
| 2013/0211057 A1 | 8/2013 | Seeboth et al. | |
| 2015/0322183 A1 | 11/2015 | Vallat et al. | |

FOREIGN PATENT DOCUMENTS

| | | |
|---|---|---|
| CN | 101309927 A | 11/2008 |
| CN | 102985444 A | 3/2013 |
| EP | 1954705 B1 | 3/2012 |
| WO | 2012007685 A1 | 1/2012 |
| WO | 2013007442 A1 | 1/2013 |
| WO | 2014090756 A1 | 6/2014 |

OTHER PUBLICATIONS

El-Nashar (The Compatibilization of EPDM/SBR Blends by EPDM-Graft-Styrene Copolymer, Polymer plastics technology and engineering, vol. 43, No. 5, pp. 1425-1441, 2004, published on Jun. 2004.*
Chinese Office Action dated Nov. 14, 2017.
International Search Report for PCT/EP2015/065750 dated Sep. 17, 2015.

* cited by examiner

*Primary Examiner* — Gregory Listvoyb
(74) *Attorney, Agent, or Firm* — Dickinson Wright PLLC

(57) ABSTRACT

A polymer comprises randomly distributed units UA, UB, UC and UD and at least one unit bearing a subunit F according to the respective molar percentages m, n, o, p and f F pendant along the chain of the polymer and bearing an associative group comprising at least one nitrogen atom, $R_1$ and $R_2$, which are identical or different, denoting a hydrogen atom, a methyl radical or a phenyl radical which is unsubstituted or substituted in the ortho, meta or para position by a methyl radical, $m \geq 50$, $n \geq 0$, $o \geq 0$, $f > 0$, $0 < o + p \leq 25$, m, n, o, p and f ranging from 0 to 100, the respective molar percentages of m, n, o, p and f calculated based on the sum of $m+n+o+p+f$, which is equal to 100.

14 Claims, No Drawings

POLYMER MODIFIED ALONG THE CHAIN AND PROCESS FOR THE SYNTHESIS THEREOF

This application is a 371 national phase entry of PCT/EP2015/065750, filed 9 Jul. 2015, which claims benefit of French Patent Application No. 1457012, filed 21 Jul. 2014, the entire contents of which are incorporated herein by reference for all purposes.

BACKGROUND

1. Technical Field

The present invention relates to a polymer bearing pendant associative groups along its polymer chain, and also to its process of synthesis.

2. Related Art

Modifying the chemical structure of a polymer generally impacts the chemical and physical properties of the polymer, and also the properties of the compositions containing it. Modifying the structure of a polymer, such as the functionalization of a polymer, is particularly sought for when it is desired to bring together a polymer and a filler in a composition. Chemically modifying a polymer can improve the dispersion of the filler in the polymer and can thus make it possible to obtain a more homogeneous material. In the case of certain fillers, such as carbon black or silica, a better dispersion of the filler will generally be reflected by a fall in hysteresis of the composition.

Furthermore, in the field of tires, rubber compositions based on elastomer and on reinforcing filler which not only have a low hysteresis but which are also the most resistant to wear are also sought for. For example, the use of a diene elastomer bearing, at the chain end, a silanol functional group in a rubber composition reinforced by a silica is known to significantly improve both the wear resistance and the rolling resistance of a tire containing this composition in its tread. Reference may be made, for example, to the publication of Patent EP 778 311 B1.

Tire manufacturers are always seeking to continually improve the wear resistance and the rolling resistance of a tire.

SUMMARY

It has been discovered that the use of an elastomer of specific microstructure bearing associative groups along its chain in a reinforced rubber composition makes it possible to reach improved wear resistance and rolling resistance of a tire.

Thus, a first subject-matter of the invention is a polymer which comprises the following units UA, UB, UC and UD and at least one unit bearing a subunit F,

UA)

—CH$_2$—CH$_2$— according to a molar percentage of m%

UB)

—CH$_2$—R$_1$C=CR$_2$—CH$_2$— according to a molar percentage of n%

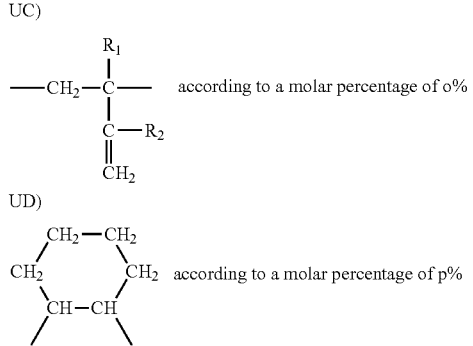

which units UA, UB, UC and UD are distributed randomly within the polymer,
the subunit F being pendant along the chain of the polymer and bearing an associative group comprising at least one nitrogen atom,
the unit bearing the subunit F being present in the polymer chain according to a molar percentage of f %,
R$_1$ and R$_2$, which are identical or different, denoting a hydrogen atom, a methyl radical or a phenyl radical which is unsubstituted or substituted in the ortho, meta or para position by a methyl radical,
m≥50
n≥0
o≥0
f>0
0<o+p≤25
m, n, o, p and f being numbers ranging from 0 to 100
the respective molar percentages of m, n, o, p and f being calculated on the basis of the sum of m+n+o+p+f, which is equal to 100.

Another subject-matter of the invention is a process for manufacturing the polymer in accordance with the invention.

The invention also relates to a rubber composition comprising the polymer in accordance with the invention, in particular elastomer, and a reinforcing filler.

The invention also relates to a tire comprising the rubber composition in accordance with the invention, in particular in its tread.

I. DETAILED DESCRIPTION

In the present description, unless expressly indicated otherwise, all the percentages (%) shown are % by weight. The abbreviation "phr" means parts by weight per hundred parts of elastomer (of the total of the elastomers, if several elastomers are present).

Furthermore, any interval of values denoted by the expression "between a and b" represents the range of values greater than "a" and less than "b" (that is to say, limits a and b excluded), whereas any interval of values denoted by the expression "from a to b" means the range of values extending from "a" up to "b" (that is to say, including the strict limits a and b).

The polymer in accordance with embodiments of the invention has the essential characteristic of comprising the following units UA, UB, UC and UD and at least one unit bearing a subunit F,

UA)

—CH$_2$—CH$_2$— according to a molar percentage of m %

-continued

UB)

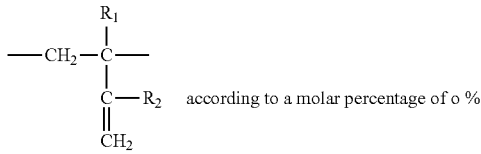

according to a molar percentage of n %

UC)

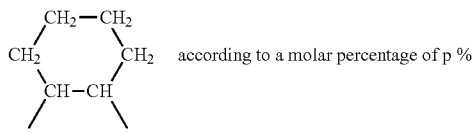

according to a molar percentage of o %

UD)

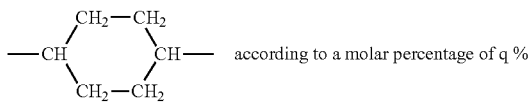

according to a molar percentage of p % which units UA, UB, UC and UD are distributed randomly within the polymer, the subunit F being pendant along the chain of the polymer and bearing an associative group comprising at least one nitrogen atom, the unit bearing the subunit F being present in the polymer chain according to a molar percentage of f %, $R_1$ and $R_2$, which are identical or different, denoting a hydrogen atom, a methyl radical or a phenyl radical which is unsubstituted or substituted in the ortho, meta or para position by a methyl radical, $m \geq 50$ $n \geq 0$ $o \geq 0$ $f > 0$ $0 < o+p \leq 25$ m, n, o, p and f being numbers ranging from 0 to 100 the respective molar percentages of m, n, o, p and f being calculated on the basis of the sum of m+n+o+p+f, which is equal to 100.

Associative group is understood to mean one or more associative groups, preferably just one.

According to a specific embodiment of the invention, the polymer in accordance with embodiments of the invention contains the following units UE distributed randomly within the polymer,

UE)

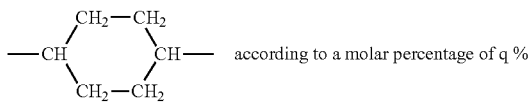

according to a molar percentage of q %

$o+p+q \geq 10$ $q \geq 0$ the respective molar percentages of m, n, o, p, q and f being calculated on the basis of the sum of m+n+o+p+q+f, which is equal to 100.

Whereas the subunit of the unit UD forms a divalent hydrocarbon ring comprising 6 carbon atoms of 1,2-cyclohexane type, the subunit of the unit UE forms a divalent hydrocarbon ring comprising 6 carbon atoms of 1,4-cyclohexane type.

According to another specific embodiment of the invention, the polymer in accordance with embodiments of the invention contains the following units UF distributed randomly within the polymer,

UF)

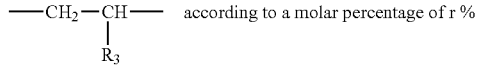

according to a molar percentage of r %

$R_3$ denoting an alkyl radical having from 1 to 4 carbon atoms or an aryl radical, $0 \leq r \leq 25$, preferably $0 \leq r \leq 10$, the respective molar percentages of m, n, o, p, r and f being calculated on the basis of the sum of m+n+o+p+r+f, which is equal to 100.

According to this specific embodiment of the invention, the polymer in accordance with embodiments of the invention can comprise q % of units UE distributed randomly within the polymer, in which case the respective molar percentages of m, n, o, p, q and r are calculated on the basis of the sum of m+n+o+p+q+r, which is equal to 100.

According to a specific embodiment of the invention, the units bearing the subunit F derive from one of the two units UB and UC or else from both units UB and UC. According to this specific embodiment of the invention, the subunit F is grafted to units UB or to units UC or else to units UB and UC in order to result in the units of the polymer bearing the pendant subunit F along the chain of the polymer. In the case where all the units UB and UC are grafted by the subunit F, n and o are equal to 0.

According to a preferred embodiment of the invention, at least one of the two percentages n and o is different from 0, preferably both are different from 0, in which case the polymer is regarded as a diene polymer, that is to say that the polymer comprises units of diene origin which comprise a carbon-carbon double bond.

According to any one of the embodiments of the invention, the polymer in accordance with embodiments of the invention preferably does not contain a unit UF.

According to one embodiment of the invention, at least one of the two molar percentages p and q is different from 0. In other words, the polymer in accordance with embodiments of the invention preferably contains at least one of the subunits which have a divalent hydrocarbon ring comprising 6 carbon atoms of 1,2-cyclohexane type and a divalent hydrocarbon ring comprising 6 carbon atoms of 1,4-cyclohexane type.

According to any one of the embodiments of the invention, p is more preferably strictly greater than 0.

According to one embodiment of the invention, the polymer in accordance with embodiments of the invention contains, as monomer units, only the units UA, UB, UC and UD and the units bearing the subunit F according to their respective molar percentages m, n, o, p and f, preferably all different from 0.

According to another embodiment of the invention, the polymer in accordance with embodiments of the invention contains, as monomer units, only the units UA, UB, UC, UD and UE and the units bearing the subunit F according to their respective molar percentages m, n, o, p, q and f, preferably all different from 0.

According to any one of the embodiments of the invention, the units UB present in the polymer in accordance with embodiments of the invention preferably have the trans configuration represented by the following formula:

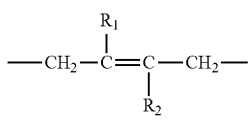

According to a preferred embodiment of the invention, $R_1$ and $R_2$ are identical and each denote a hydrogen atom.

According to any one of the embodiments of the invention, the molar percentage f preferably varies from 0.01 to 50%, more preferably from 0.01 to 10%, more preferably still from 0.03 to 5% and better still from 0.03 to 3%.

Associative group is understood to mean groups capable of associating with one another via hydrogen, ionic and/or hydrophobic bonds. According to a preferred form of the invention, they are groups capable of associating via hydrogen bonds. When the associative groups are capable of associating via hydrogen bonds, each associative group comprises at least one donor "site" and one site which is accepting with regard to the hydrogen bond, so that two identical associative groups are self-complementary and can associate together with the formation of at least two hydrogen bonds. The associative groups according to embodiments of the invention are also capable of associating via hydrogen, ionic and/or hydrophobic bonds with functional groups present on fillers.

According to any one of the embodiments of the invention, the associative group is selected from the group consisting of the imidazolidinyl, triazolyl, triazinyl, bis-ureyl and ureido-pyrimidyl groups.

According to a preferred embodiment of the invention, the associative group corresponds to one of the formulae (I) to (V):

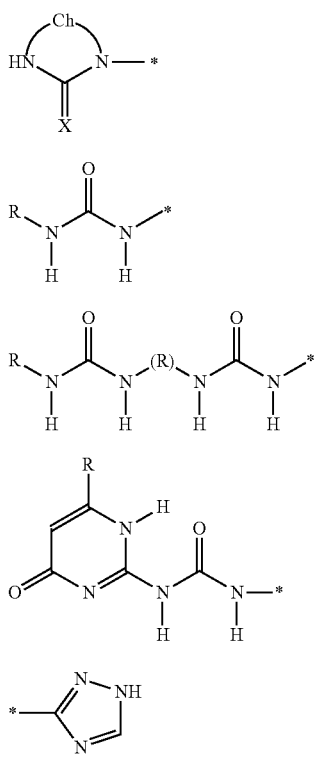

where:
Ch denotes a carbon chain which can optionally contain heteroatoms,

* represents a direct or indirect connection to the chain of the polymer,
R denotes a hydrocarbon group which can optionally contain heteroatoms,
X denotes an oxygen or sulphur atom or an NH group, preferably an oxygen atom.

Generally, the ring in the formula (I) is a ring comprising 5 or 6 atoms.

According to a more preferable embodiment of the invention, the associative group corresponds to the formula (VI):

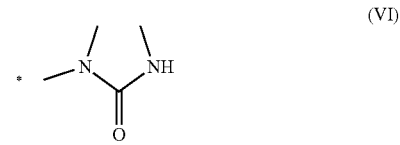

where * represents a direct or indirect connection to the chain of the polymer.

According to any one of the embodiments of the invention, the polymer in accordance with embodiments of the invention is preferably an elastomer.

According to any one of the embodiments of the invention, the polymer in accordance with embodiments of the invention preferably exhibits a number-average molar mass (Mn) of at least 60 000 g/mol and of at most 1 500 000 g/mol. The polymer in accordance with embodiments of the invention preferably exhibits a polydispersity index PI, equal to Mw/Mn (Mw being the weight-average molar mass), of between 1.20 and 3.00. The Mn, Mw and PI values are measured according to the method described in section 11.1.

The polymer in accordance with embodiments of the invention can be prepared by a grafting reaction according to a process, which is another subject-matter of the invention, which comprises the reaction of a starting diene polymer with a modifying agent, which modifying agent comprises, on the one hand, an associative group comprising at least one nitrogen atom and, on the other hand, a subunit G containing a group which is reactive with regard to the chain of the starting diene polymer.

According to a specific embodiment of the process in accordance with the invention, G denotes a subunit containing a group which is reactive with regard to at least one diene unit of the starting diene polymer. Diene unit is understood to mean a monomer unit resulting from the insertion of a diene monomer by polymerization of a diene into the polymer chain, the diene unit comprising a carbon-carbon double bond, the diene unit preferably being a 1,3-butadiene monomer unit, namely —CH$_2$—CH=CH—CH$_2$— or —CH$_2$—CH(CH=CH$_2$)—. The reactive group present in G makes it possible to graft the associative group or groups to the chain of the starting diene polymer by a reaction involving a carbon-carbon double bond present in the diene unit or units of the starting diene polymer.

According to a specific embodiment of the invention, the reactive group present in G is selected from the group consisting of the SH functional group, the azodicarbonyl group and a dipole containing at least and preferably one nitrogen atom. The azodicarbonyl group is defined by the formula —CO—N=N—CO—.

According to a first alternative form of the invention, the modifying agent contains an SH functional group and is of formula (VII):

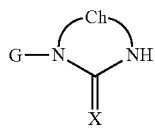
(VII)

where:
- X denotes an oxygen or sulphur atom or an —NH group, preferably an oxygen atom,
- Ch denotes a carbon chain which can optionally contain heteroatoms,
- G denotes a subunit containing, as reactive group, the SH functional group.

According to one embodiment of the first alternative form of the invention, the modifying agent of formula (VII) is a preferably dinitrogenous compound, generally having 5 or 6 ring members, in particular a compound belonging to the family of the imidazolidinyls, the imidazolidinyl group being the associative group. Suitable as example of modifying agent is, for example, 11-mercapto-N-(2-(2-oxoimidazolidin-1-yl)ethyl)undecanamide.

According to a second alternative form of the invention, the modifying agent contains an azodicarbonyl group and is of formula (VIII):

W—CO—N=N—CO-Sp-A    (VIII)

where:
- A represents the associative group comprising at least one nitrogen atom,
- Sp is a divalent spacer group connecting the azodicarbonyl group to the associative group A,
- W represents:
  a group of formula:

R'—Z— in which:
  - —Z represents an oxygen or sulphur atom or an —NH or —NR' group,
  - —R' represents a $C_1$-$C_{20}$ alkyl group, preferably a $C_1$-$C_6$ alkyl group and entirely preferably a $C_1$-$C_4$ alkyl group, for example methyl or ethyl, or
  a group of formula:

Sp'-A' in which:
  - Sp', which is identical to or different from Sp, is a divalent spacer group connecting the azodicarbonyl group to another associative group A',
  - A', which is identical to or different from A, is an associative group comprising at least one nitrogen atom.

According to the second alternative form of the invention, the associative group comprising at least one nitrogen atom, in the case in point A and optionally A', is preferably selected from an imidazolidinyl, ureyl, bis-ureyl, ureido-pyrimidyl or triazolyl group.

According to a preferred embodiment of the second alternative form of the invention, the associative group comprising at least one nitrogen atom, in the case in point A and optionally A', corresponds to one of the formulae (IX) to (XIII):

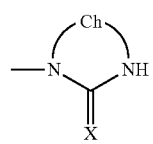
(IX)

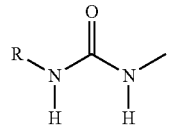
(X)

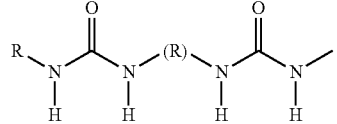
(XI)

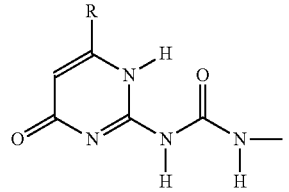
(XII)

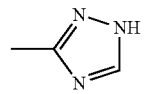
(XIII)

where:
- X denotes an oxygen or sulphur atom or an —NH group, preferably an oxygen atom,
- Ch denotes a carbon chain which can optionally contain heteroatoms,
- R denotes a hydrocarbon group which can optionally contain heteroatoms.

For example, modifying agents according to the second alternative form of the invention are represented by the formula (XIV) or (XV):

R'—Z—CO—N=N—CO-Sp-A    (XIV)

or

A'-Sp'-CO—N=N—CO-Sp-A    (XV)

the definition of the symbols R', Z, A, A', Sp and Sp' being that given in the context of the second alternative form of the invention.

The "spacer" group, whether it is Sp or Sp', makes it possible to connect an azodicarbonyl group to an associative group and thus can be of any type known per se. However, the "spacer" group must not interfere or interfere only slightly with the azodicarbonyl group and the associative group. The "spacer" group is preferably a linear, branched or cyclic hydrocarbon chain, can contain one or more aromatic radicals and/or one or more heteroatoms. The said chain can optionally be substituted, provided that the substituents are inert with regard to the azodicarbonyl and associative groups.

According to a preferred embodiment of the second alternative form of the invention, the "spacer" group is a linear or branched $C_1$-$C_{24}$, preferably $C_1$-$C_{10}$, alkyl chain optionally comprising one or more heteroatoms chosen from nitrogen, sulphur, silicon or oxygen atoms, more preferably a linear $C_1$-$C_6$ alkylene chain. Entirely preferably, the "spacer" group Sp or Sp' is chosen from —$(CH_2)_y$—, —NH—$(CH_2)_y$— or —O—$(CH_2)_y$—, y being an integer from 1 to 6. These preferred embodiments can be applied to any one of the embodiments of the second alternative form of the invention.

According to any one of the embodiments of the second alternative form of the invention, the modifying agent is preferably chosen from the following compounds of formula (XVI) or (XVII):

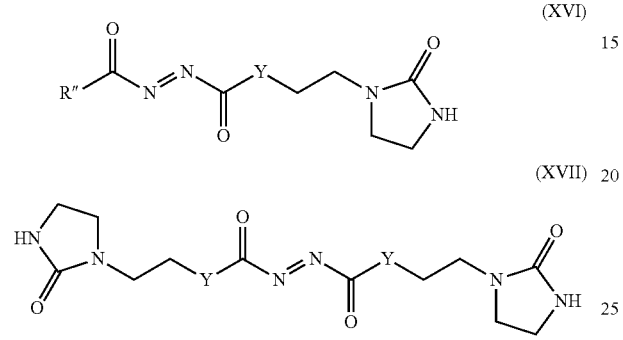

in which:
Y represents a divalent group chosen from a methylene group, an oxygen or sulphur atom and an —NH— group, and
R" represents a $C_1$-$C_6$ alkoxy group, preferably a $C_1$-$C_4$ alkoxy group and entirely preferably methoxy or ethoxy.

According to any one of the embodiments of the second alternative form of the invention, the modifying agent is more preferably chosen from the compounds of formulae (XVIII) to (XXI) below:

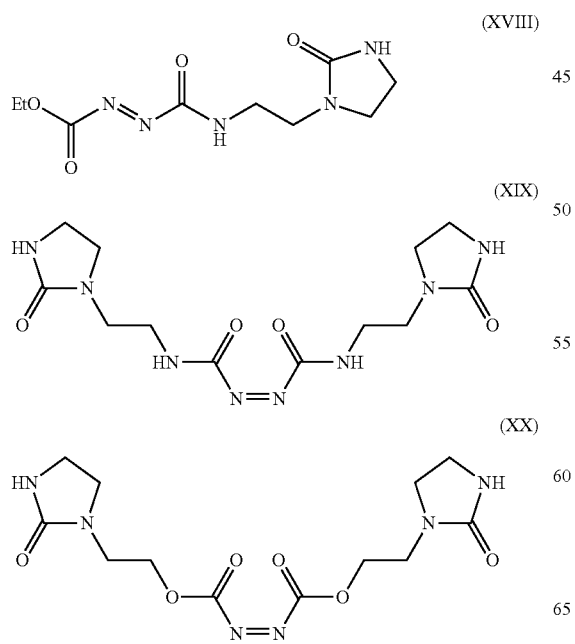

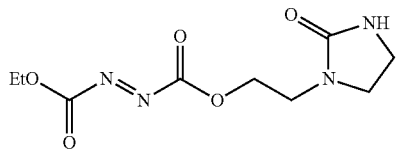

These compounds, useful for the requirements of the second alternative form of the invention, can be prepared according to the processes described in Patent Application WO 2012007443.

According to the second alternative form of the invention, the grafting of the modifying agent is carried out by an "ene reaction" with a carbon-carbon double bond of the chain of the starting diene polymer.

According to a third alternative form of the invention, the modifying agent contains a (one or more) group Q and a (one or more) group A connected together by a group B, in which:
Q comprises a dipole containing at least and preferably one nitrogen atom,
A represents the associative group comprising at least one nitrogen atom,
B is an atom or a group of atoms forming a bond between Q and A.

According to any one of the embodiments of the third alternative form, the modifying agent preferably contains just one group Q bonded to the group(s) A by the group B.

According to any one of the embodiments of the third alternative form, the modifying agent more preferably contains just one group Q and just one group A connected together by the group B.

Dipole is understood to mean a functional group capable of forming a [1,3]-dipolar cycloaddition on an unsaturated carbon-carbon bond.

According to a preferred embodiment of the third alternative form of the invention, the group A corresponds to one of the following formulae (XXII) to (XXVI):

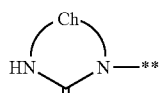

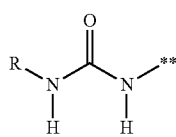

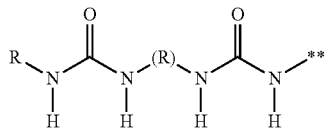

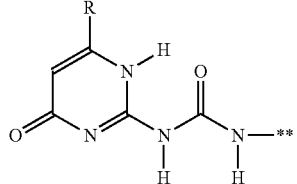

-continued

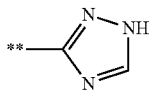
(XXVI)

where:
** represents a direct attachment to B,
Ch denotes a carbon chain which can optionally contain heteroatoms,
R is as defined above, namely a hydrocarbon group which can optionally contain heteroatoms,
X' denotes an oxygen or sulphur atom, preferably an oxygen atom.

According to a more preferable embodiment of the third alternative form of the invention, the group A corresponds to the formula (XXVII):

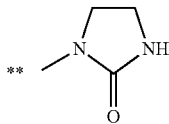
(XXVII)

where ** represents a direct attachment to B.

The group B, which is an atom or a group of atoms forming a bond between Q and A, is preferably a group containing up to 20 carbon atoms which can contain at least one heteroatom. B can be an aliphatic chain preferably containing from 1 to 20 carbon atoms, more preferably from 1 to 12 carbon atoms and more preferably still from 1 to 6 carbon atoms, or a group comprising an aromatic subunit and preferably containing from 6 to 20 carbon atoms, more preferably from 6 to 12 carbon atoms.

According to the third alternative form of the invention, the modifying agent is preferably a nitrile oxide, a nitrone or a nitrilimine. In other words, the third alternative form of the invention comprises three alternatives, the first corresponding to Q containing a subunit —C≡N→O, the second a subunit —C=N(→O)— and the third a subunit —C≡N→N—.

According to the first alternative of the third alternative form of the invention employing a nitrile oxide as modifying agent, Q preferably represents the subunit corresponding to the formula (XXVIII) in which four of the five symbols $R_4$ to $R_8$, which are identical or different, are each an atom, in particular H, or a group of atoms and the fifth symbol denotes a direct attachment to B, it being known that $R_4$ and $R_8$ are preferably both different from H. The four of the five symbols $R_4$ to $R_8$ can be aliphatic or aromatic groups. The aliphatic groups can contain from 1 to 20 carbon atoms, preferably from 1 to 12 carbon atoms, more preferably from 1 to 6 carbon atoms and more preferably still from 1 to 3 carbon atoms. The aryl, alkylaryl or arylalkyl aromatic groups can contain from 6 to 20 carbon atoms and preferably from 6 to 12 carbon atoms.

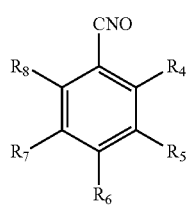
(XXVIII)

$R_4$, $R_6$ and $R_8$ are preferably each an alkyl group of 1 to 6 carbon atoms, more preferably of 1 to 3 carbon atoms and more preferably still a methyl or ethyl group.

According to a specific embodiment of this first alternative, $R_4$, $R_6$ and $R_8$ are identical. In the case where $R_4$, $R_6$ and $R_8$ are identical, $R_4$, $R_6$ and $R_8$ are preferably each an alkyl group of 1 to 6 carbon atoms, more preferably of 1 to 3 carbon atoms and more preferably still a methyl or ethyl group.

Suitable according to this first alternative are, for example, the 1,3-dipolar compounds of formula (XXIX) to (XXXIV):

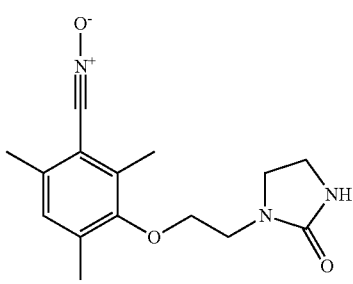
(XXIX)

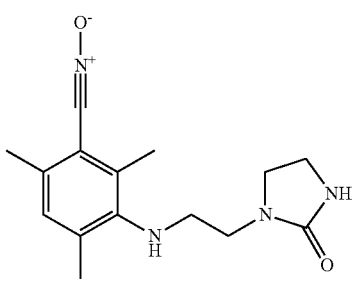
(XXX)

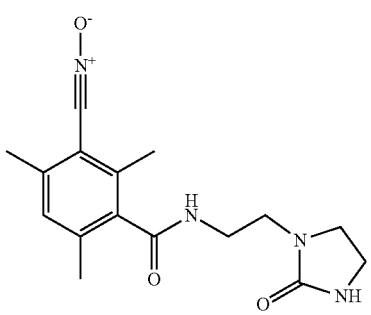
(XXXI)

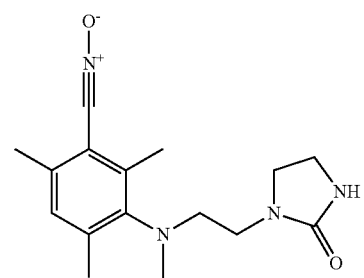
(XXXII)

-continued

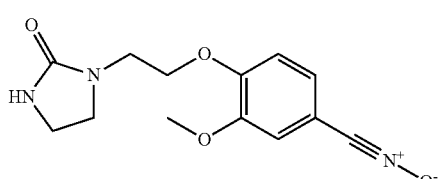
(XXXIII)

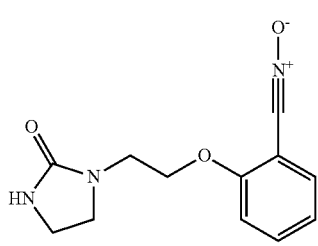
(XXXIV)

More preferably, the modifying agent according to this first alternative is the 1,3-dipolar compound of formula (XXIX), 2,4,6-trimethyl-3-(2-(2-oxoimidazolidin-1-yl)ethoxy)benzonitrile oxide.

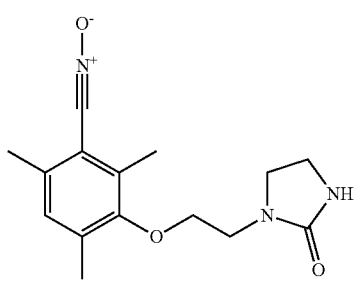
(XXIX)

According to the second alternative of the third alternative form of the invention employing a nitrone as modifying agent, Q preferably comprises the subunit corresponding to the formula (XXXV) or (XXXVI):

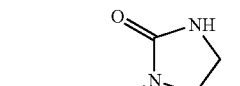
(XXXV)

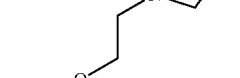
(XXXVI)

where:
Y$_1$ is an aliphatic group, preferably an alkyl group preferably containing from 1 to 12 carbon atoms, or a group containing from 6 to 20 carbon atoms and comprising an aromatic subunit, preferably an aryl or alkylaryl group, more preferably a phenyl or tolyl group, and Y$_2$ is an aliphatic group, preferably a saturated hydrocarbon group, preferably containing from 1 to 12 carbon atoms, or a group comprising an aromatic subunit and preferably containing from 6 to 20 carbon atoms, Y$_2$ comprising a direct attachment to B.

Suitable according to this second alternative are, for example, the 1,3-dipolar compounds of formula (XXXVII) to (XLI):

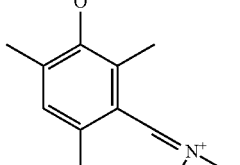
(XXXVII)

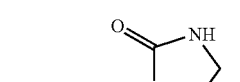
(XXXVIII)

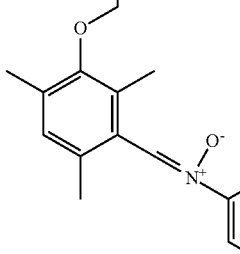
(XXXIX)

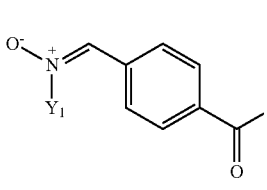
(XL)

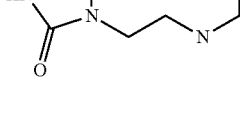
(XLI)

with Y$_1$ being as defined above, namely an aliphatic group, preferably an alkyl group preferably containing from 1 to 12 carbon atoms, or a group containing from 6 to 20 carbon atoms and comprising an aromatic subunit, preferably an aryl or alkylaryl group, more preferably a phenyl or tolyl group.

These compounds, useful for the requirements of the third alternative form of the invention, can be prepared according to the processes described in Patent Application WO 2012007441.

According to the third alternative form of the invention, whatever its alternatives, the grafting of the modifying agent is carried out by [3+2] cycloaddition of the reactive group or groups of the modifying agent and one or more carbon-carbon double bonds of the chain of the starting diene polymer. The reaction product of a nitrile oxide, of a nitrone and of a nitrilimine, for example with a 1,4-butadiene unit, can be illustrated by the following equations, in which the symbol ¤ represents any substituent:

Cycloaddition of a Nitrile Oxide to a Butadiene Unit

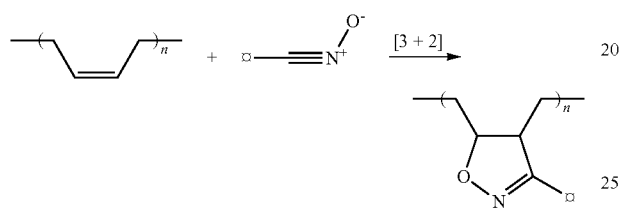

Cycloaddition of a Nitrone to a Butadiene Unit

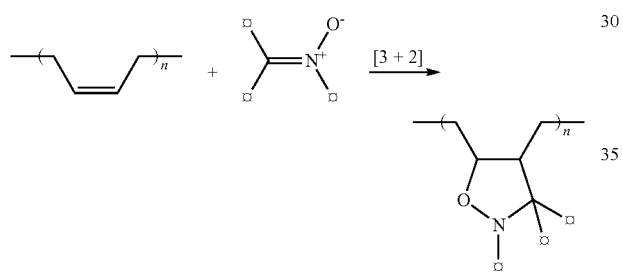

Cycloaddition of a Nitrilimine to a Butadiene Unit

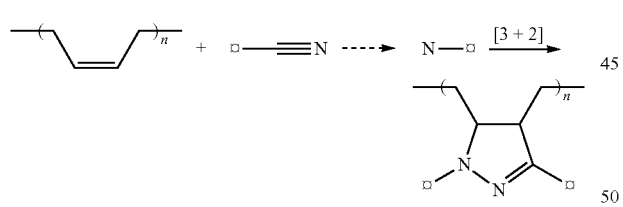

According to any one of the three alternative forms of the invention, the grafting of the modifying agent can be carried out in bulk or in solution. When it is carried out in bulk, for example in an internal mixer or an external mixer, such as an open mill, the grafting is then carried out either at a temperature of the external mixer or of the internal mixture of less than 60° C., followed by a stage of reaction under a press or in an oven at temperatures ranging from 80° C. to 200° C., or at a temperature of the external mixer or of the internal mixer of greater than 60° C., without subsequent heat treatment. According to the first alternative form of the invention, which employs a modifying agent containing an SH functional group, the grafting of the modifying agent to a or the carbon-carbon double bonds of the starting diene polymer can be carried out in the presence of peroxide, as is described, for example, in Patent Application WO2011113818.

The grafting process can be carried out continuously or batchwise. If the grafting takes place in solution, the polymer thus grafted can be separated from its solution by any type of means known to a person skilled in the art and in particular by a steam stripping operation.

According to any one of the embodiments of the process in accordance with the invention, whether the first, second or third alternative form, the amount of modifying agent reacted preferably varies from 0.01 to 50, more preferably from 0.01 to 10, more preferably still from 0.03 to 5 and better still from 0.03 to 3 molar equivalents of associative group A per 100 mol of monomer units of the starting diene polymer.

The starting diene polymer comprises the following units UA, UB, UC and UD distributed randomly within the starting diene polymer,

UA)

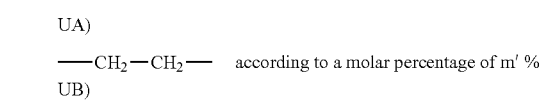

according to a molar percentage of m' %

UB)

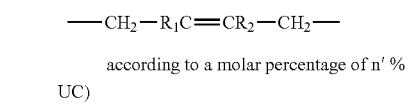

according to a molar percentage of n' %

UC)

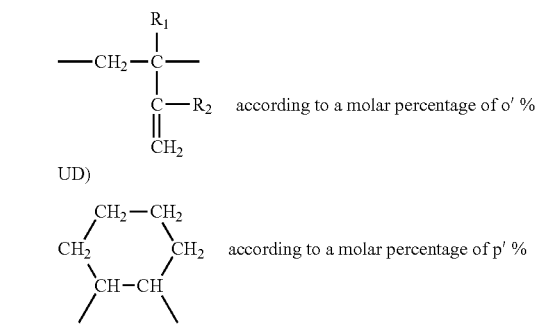

according to a molar percentage of o' %

UD)

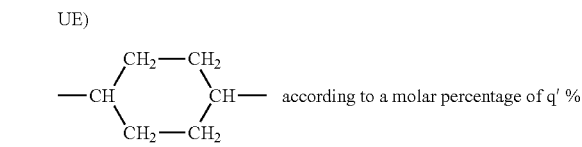

according to a molar percentage of p' %

$R_1$ and $R_2$, which are identical or different, denoting a hydrogen atom, a methyl radical or a phenyl radical which is unsubstituted or substituted in the ortho, meta or para position by a methyl radical, $m' \geq 50$ $0 < o' + p' \leq 25$ $n' + o' > 0$ m', n', o' and p' being numbers ranging from 0 to 100 the respective molar percentages of m', n', o' and p' being calculated on the basis of the sum of m'+n'+o'+p', which is equal to 100.

According to a specific embodiment of the invention, the starting diene polymer contains units UE distributed randomly within the starting diene polymer;

UE)

—CH〈CH₂—CH₂〉CH— according to a molar percentage of q' %
    〈CH₂—CH₂〉

$o' + p' + q' \geq 10$ $q' \geq 0$ the respective molar percentages of m', n', o', p' and q' being calculated on the basis of the sum of m'+n'+o'+p'+q', which is equal to 100.

Whereas the subunit of the unit UD forms a divalent hydrocarbon ring comprising 6 carbon atoms of 1,2-cyclohexane type, the subunit of the unit UE forms a divalent hydrocarbon ring comprising 6 carbon atoms of 1,4-cyclohexane type.

According to another specific embodiment of the invention, the starting diene polymer contains units UF distributed randomly within the starting diene polymer;

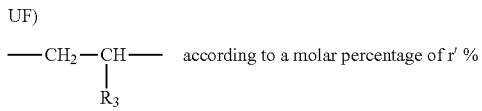

$R_3$ denoting an alkyl radical having from 1 to 4 carbon atoms or an aryl radical, $0 \leq r' \leq 25$, preferably $0 \leq r' \leq 10$, the respective molar percentages of m', n', o', p' and r' being calculated on the basis of the sum of m'+n'+o'+p'+r', which is equal to 100.

According to this specific embodiment of the invention, the starting diene polymer can comprise q' molar % of units UE distributed randomly within the starting diene polymer, in which case the respective molar percentages of m', n', o', p', q' and r' are calculated on the basis of the sum of m'+n'+o'+p'+q'+r', which is equal to 100.

According to any one of the embodiments of the invention, the starting diene polymer preferably does not contain a unit UF.

According to any one of the embodiments of the invention, at least one of the two molar percentages p' and q' is preferably different from 0. In other words, the starting diene polymer preferably contains at least one of the subunits which have a divalent hydrocarbon ring comprising 6 carbon atoms of 1,2-cyclohexane type and a divalent hydrocarbon ring comprising 6 carbon atoms of 1,4-cyclohexane type.

According to any one of the embodiments of the invention, p' is more preferably strictly greater than 0.

According to one embodiment of the invention, the starting diene polymer contains, as monomer units, only the units UA, UB, UC, UD and UE according to their respective molar percentages m', n', o', p' and q', preferably all different from 0.

According to another embodiment of the invention, the starting diene polymer contains, as monomer units, only the units UA, UB, UC and UD according to their respective molar percentages m', n', o' and p', preferably all different from 0.

According to any one of the embodiments of the invention, the units UB present in the starting diene polymer preferably have the trans configuration represented by the following formula:

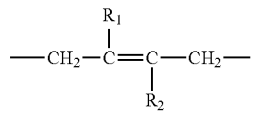

The starting diene polymer can be obtained according to different methods of synthesis known to a person skilled in the art, in particular as a function of the targeted values of m', n', o', p', q' and r'. Generally, the starting diene polymer can be prepared by copolymerization of at least one conjugated diene monomer and of ethylene and according to known methods of synthesis, in particular in the presence of a catalytic system comprising a metallocene complex. In this connection, mention may be made of the metallocene complexes described in the documents EP 092 731 A1, EP 1 554 321 A1, EP 1 656 400 A1, EP 1 829 901 A1, EP 1 954 705 A1 and EP 1 957 506 A1 on behalf of the Applicant Companies.

In the synthesis of the starting diene polymer, a conjugated diene having from 4 to 12 carbon atoms is suitable in particular as conjugated diene monomer. Mention may be made of 1,3-butadiene, 2-methyl-1,3-butadiene, 2,3-dimethyl-1,3-butadiene, an aryl-1,3-butadiene or 1,3-pentadiene. According to a preferred aspect, the diene monomer is 1,3-butadiene or 2-methyl-1,3-butadiene, more preferably 1,3-butadiene, in which case $R_1$ and $R_2$ each represent a hydrogen.

Thus, according to some of these methods of synthesis, the starting diene polymer can be obtained by copolymerization of at least one conjugated diene monomer and of ethylene, in the presence of a catalytic system comprising a lanthanide metallocene complex with ansa ligands of fluorenyl type. In this connection, mention may be made of the metallocene complexes described in the documents EP 1 092 731 A1, EP 1 554 321 A1 and EP 1 954 705 A1.

The starting diene polymer which contains UF units according to a specific embodiment of the invention can be obtained by copolymerization of at least one conjugated diene monomer and of two olefins, such as ethylene and an α-olefin, in the presence of a catalytic system comprising a lanthanide metallocene complex with ligands of ansa cyclopentadienyl-fluorenyl type. For example, an α-olefin having from 3 to 18 carbon atoms, advantageously having from 3 to 6 carbon atoms, is suitable as α-olefin monomer. Mention may be made of propylene, butene, pentene, hexene or a mixture of these compounds. Mention may also be made, as termonomer used in combination with at least one conjugated diene monomer and ethylene, of a styrene derivative. The catalytic systems based on metallocene complexes can be those described in the documents EP 1 092 731 A1, EP 1 656 400 A1, EP 1 829 901 A1 and EP 1 957 506 A1 on behalf of the Applicant Companies.

According to any one of the embodiments of the invention, the starting diene polymer preferably exhibits a number-average molar mass (Mn) of at least 60 000 g/mol and of at most 1 500 000 g/mol. The starting diene polymer useful for the requirements of embodiments of the invention preferably exhibits a polydispersity index PI, equal to Mw/Mn (Mw being the weight-average molar mass), of between 1.20 and 3.00. The Mn, Mw and PI values are measured according to the method described in section 11.1.

According to any one of the embodiments of the invention, the starting diene polymer is preferably an elastomer.

The polymer in accordance with embodiments of the invention, in particular an elastomer, can be used in a composition which comprises any type of "reinforcing" filler known for its abilities to reinforce a rubber composition which can be used for the manufacture of tires, a carbon black, a reinforcing inorganic filler, such as silica, with which a coupling agent is combined in a known way, or else a mixture of these two types of filler.

Such a reinforcing filler typically consists of nanoparticles, the (weight-)average size of which is less than a micrometer, generally less than 500 nm, usually between 20 and 200 nm, in particular and more preferably between 20 and 150 nm.

Preferably, the amount of total reinforcing filler (carbon black and/or other reinforcing inorganic filler, such as silica) is between 20 and 200 phr, more preferably between 30 and 150 phr, the optimum being, in a known way, different according to the specific applications targeted.

All carbon blacks, in particular the blacks conventionally used in tires or their treads ("tire-grade" blacks), are suitable as carbon blacks. Mention will more particularly be made, among the latter, of the reinforcing carbon blacks of the 100, 200 or 300 series or the blacks of the 500, 600 or 700 series (ASTM grades).

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 m$^2$/g, preferably from 30 to 400 m$^2$/g, in particular between 60 and 300 m$^2$/g.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Particularly suitable, without the definition below being limiting, are silane polysulphides corresponding to the following general formula (I):

$$Z-A-S_x-A-Z, \text{ in which:} \quad (I)$$

x is an integer from 2 to 8 (preferably from 2 to 5);

the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene);

the Z symbols, which are identical or different, correspond to one of the three formulae below:

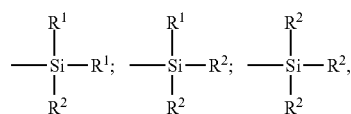

in which:

the R$^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);

the R$^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula [($C_2H_5O)_3Si(CH_2)_3S_2]_2$, or bis(triethoxysilylpropyl) disulphide, abbreviated to TESPD, of formula [($C_2H_5O)_3Si(CH_2)_3S]_2$.

Mention will be made, as examples of other organosilanes, for example, of the silanes bearing at least one thiol (—SH) functional group (referred to as mercaptosilanes) and/or at least one masked thiol functional group, such as described, for example, in Patents or Patent Applications U.S. Pat. No. 6,849,754, WO 99/09036, WO 2006/023815, WO 2007/098080, WO 2010/072685 and WO 2008/055986.

The content of coupling agent is advantageously less than 20 phr, it being understood that it is generally desirable to use as little as possible of it. Typically, the content of coupling agent represents from 0.5% to 15% by weight, with respect to the amount of inorganic filler. Its content is preferably between 0.5 and 12 phr, more preferably within a range extending from 3 to 10 phr. This content is easily adjusted by a person skilled in the art depending on the content of inorganic filler used in the composition.

The crosslinking system can be based either on sulphur, on the one hand, or on sulphur donors and/or on peroxide and/or on bismaleimides, on the other hand.

The crosslinking system is preferably a vulcanization system, that is to say a system based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), or else known vulcanization retarders, being incorporated during the first non-productive phase and/or during the productive phase, as described subsequently.

The sulphur is used at a preferred content of 0.5 to 12 phr, in particular of 1 to 10 phr. The primary vulcanization accelerator is used at a preferred content of between 0.5 and 10 phr, more preferably of between 0.5 and 5 phr.

The rubber composition in accordance with embodiments of the invention can also comprise all or a portion of the usual additives generally used in the elastomer compositions intended to constitute external mixtures of finished rubber articles, such as tires, in particular treads, such as, for example, plasticizers or extending oils, whether the latter are aromatic or non-aromatic in nature, in particular very weakly aromatic or non-aromatic oils (e.g., paraffin oils, hydrogenated naphthenic oils, MES oils or TDAE oils), vegetable oils, in particular glycerol esters, such as glycerol trioleates, pigments, protection agents, such as antiozone waxes, chemical antiozonants or antioxidants, antifatigue agents, reinforcing resins (such as resorcinol or bismaleimide), methylene acceptors (for example phenolic novolak resin) or methylene donors (for example HMT or H3M), such as described, for example, in Application WO 02/10269.

The rubber composition according to the invention can be manufactured in appropriate mixers, using two successive phases of preparation according to a general procedure well known to those skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically below 120° C., for example between 60° C. and 100° C., during which finishing phase the chemical crosslinking agent, in particular the vulcanization system, is incorporated.

The rubber composition in accordance with embodiments of the invention can be either in the raw state (before crosslinking or vulcanization) or in the cured state (after crosslinking or vulcanization) and can be a semi-finished product which can be used in a tire, in particular in a tire tread.

The abovementioned characteristics of embodiments of the present invention, and also others, will be better understood on reading the following description of several implementational examples of the invention, given by way of illustration and without limitation.

II. EXEMPLARY EMBODIMENTS OF THE INVENTION

II.1—Measurements and Tests Used:
Glass Transition Temperature

The glass transition temperatures, Tg, of the polymers are measured using a differential scanning calorimeter. The analysis is carried out according to the requirements of Standard ASTM D3418-08.
Size Exclusion Chromatography Size exclusion chromatography (SEC) is used. SEC makes it possible to separate macromolecules in solution according to their size through columns filled with a porous gel. The macromolecules are separated according to their hydrodynamic volume, the bulkiest being eluted first. Without being an absolute method, SEC makes it possible to comprehend the distribution of the molar masses of a polymer. The various number-average molar masses (Mn) and weight-average molar masses (Mw) can be determined from commercial standards and the polydispersity index (PI=Mw/Mn) can be calculated via a "Moore" calibration.
Preparation of the Polymer:

There is no specific treatment of the polymer sample before analysis. The latter is simply dissolved, in tetrahydrofuran+1 vol % of diisopropylamine+1 vol % of triethylamine+1 vol % of distilled water or in chloroform, at a concentration of approximately 1 g/l. The solution is then filtered through a filter with a porosity of 0.45 µm before injection.
Sec Analysis:

The apparatus used is a "Waters Alliance" chromatograph. The elution solvent is tetrahydrofuran+1 vol % of diisopropylamine+1 vol % of triethylamine or chloroform, according to the solvent used for the dissolution of the polymer. The flow rate is 0.7 ml/min, the temperature of the system is 35° C. and the analytical time is 90 min. A set of four Waters columns in series, with commercial names "Styragel HMW7", "Styragel HMW6E" and two "Styragel HT6E", is used.

The volume of the solution of the polymer sample injected is 100 µl. The detector is a Waters 2410 differential refractometer and the software for making use of the chromatographic data is the Waters Empower system.

The calculated average molar masses are relative to a calibration curve produced from PSS Ready Cal-Kit commercial polystyrene standards.
$^1$H NMR Analysis The determination of the molar content of grafted nitrile oxide compound is carried out by an NMR analysis. The spectra are acquired on a Bruker 500 MHz spectrometer equipped with a 5 mm BBI Z-grad "broad band" probe. The quantitative $^1$H NMR experiment uses a simple 30° pulse sequence and a repetition time of 3 seconds between each acquisition. The samples are dissolved in carbon disulphide ($CS_2$). 100 µl of deuterated cyclohexane ($C_6D_{12}$) are added for the lock signal.

The $^1$H NMR spectrum makes it possible to quantify the grafted nitrile oxide subunits by integration of the signals characteristic of the $CH_2N$ and $CH_2O$ protons, which appear at a chemical shift of between δ=3.1-3.8 ppm.

The 2D $^1$H-$^{13}$C HSQC NMR spectrum makes it possible to confirm the nature of the grafted subunit by virtue of the chemical shifts of the carbon and proton atoms.
Dynamic Properties The dynamic properties G* and tan(δ)max are measured on a viscosity analyser (Metravib VA4000) according to Standard ASTM D 5992-96. The response of a sample of vulcanized composition (cylindrical test specimen with a thickness of 4 mm and a cross-section of 400 mm$^2$), subjected to a simple alternating sinusoidal shear stress, at a frequency of 10 Hz, under standard temperature conditions (23° C.) according to Standard ASTM D 1349-99, is recorded. A strain amplitude sweep is carried out from 0.1% to 100% (outward cycle) and then from 100% to 0.1% (return cycle). The results made use of are the complex dynamic shear modulus (G*) and the loss factor tan(δ). For the return cycle, the maximum value of tan(δ) observed, denoted tan(δ)max, is indicated.
II.2—Preparation of the Grafted Polymers:
II.2.1—Preparation of the Polymer E1-g, not in Accordance with an Embodiment of the Invention, by Grafting a 1,3-Dipolar Compound:

The polymer not in accordance with the invention, E1-g, is a copolymer of 1,3-butadiene and of styrene, SBR, containing 26% by weight of styrene unit and 24 mol % of 1,2-butadiene unit of the butadiene part, with Mn=163 000 g/mol, with PI=1.15 and with Tg=−48° C.

2,4,6-Trimethyl-3-(2-(2-oxoimidazolidin-1-yl)ethoxy) benzonitrile oxide (0.85 g, 2.93 mmol), with an NMR purity of 94 mol %, is incorporated in 60 g of starting diene polymer E1 on an open mill (external mixer at 30° C.). The mixture is homogenized in 15 turnover passes. This mixing phase is followed by a heat treatment under a press at a pressure of 10 bar and at 120° C. for 10 minutes. The polymer E1-g is obtained.

The molar degree of grafting, determined by $^1$H NMR, is 0.28% (0.28 mol of modifying agent grafted per 100 mol of polymer monomer unit), i.e. a grafting yield of 94%.
II.2.2—Preparation of the Polymer E2-g, in Accordance with an Embodiment of the Invention, by Grafting a 1,3-Dipolar Compound:

The polymer in accordance with the embodiment of the invention, E2-g, is prepared by grafting the compound 2,4,6-trimethyl-3-(2-(2-oxoimidazolidin-1-yl)ethoxy)benzonitrile oxide to a starting diene polymer E2.

The starting diene polymer E2 is a copolymer of 1,3-butadiene and of ethylene comprising 66 mol % of ethylene units, the remainder to 100% consisting of the butadiene units distributed in the 1,2-(46.4 mol % of the butadiene units), 1,4-(31.8 mol % of the butadiene units) and 1,2-cyclohexyl-(21.8 mol % of the butadiene units) form, and exhibits an Mn of 175 000 g/mol, a PI of 1.79 and a Tg of −43° C. The starting diene polymer E2 is prepared according to a polymerization process in accordance with Example 4-2 described in Patent EP 1 954 705 B1 on behalf of the Applicant Companies.

2,4,6-Trimethyl-3-(2-(2-oxoimidazolidin-1-yl)ethoxy) benzonitrile oxide (1.45 g, 5.03 mmol), with an NMR purity of 94 mol %, is incorporated in 60 g of starting diene polymer E2 on an open mill (external mixer at 30° C.). The mixture is homogenized in 15 turnover passes. This mixing phase is followed by a heat treatment under a press at a pressure of 10 bar at 120° C. for 10 minutes. The polymer E2-g is obtained.

The molar degree of grafting, determined by $^1$H NMR, is 0.29% (0.29 mol of modifying agent grafted per 100 mol of polymer monomer unit), i.e. a grafting yield of 97%.

II.3—Preparation of the Rubber Compositions:

The polymers E1-g and E2-g are used in the preparation of the rubber compositions C1 and C2. It should be noted that E1-g and E2-g are elastomeric polymers.

The formulations (in phr) of the compositions C1 and C2 are described in Table I. The compositions are identical, apart from the nature of the polymer. The composition C1 contains the polymer E1-g (grafted SBR) and the composition C2 contains the polymer E2-g (grafted copolymer of 1,3-butadiene and of ethylene).

The rubber compositions are prepared in the following way: the grafted polymer, the reinforcing filler, the coupling agent and then, after kneading for one to two minutes, the various other ingredients, with the exception of the vulcanization system, are introduced into a Polylab internal mixer of 85 cm$^3$ which is 70% filled and which has an initial vessel temperature of approximately 110° C. Thermomechanical working is then carried out (non-productive phase) in one stage (total duration of the kneading equal to approximately 5 min), until a maximum "dropping" temperature of 160° C. is reached. The mixture thus obtained is recovered and cooled and then the vulcanization system (sulphur) is added on an external mixer (homofinisher) at 25° C., everything being mixed (productive phase) for approximately 5 to 6 min.

II.4—Properties of the Rubber Compositions in the Cured State:

The compositions after vulcanization are calendered, either in the form of plaques (with a thickness ranging from 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular for treads. The results are given in Table II.

Composition C2 exhibits both a high level of stiffness in the cured state and a very low level of hysteresis, in comparison with Composition C1 not in accordance with the invention. The combined use of the elastomer E2 and of the modifying agent makes possible a decrease of 20% in tan $\delta_{max}$ at 23° C., with respect to the combined use of E1 and of the same modifying agent, whereas the two elastomers E1 and E2 have the same Tg and whereas the modifying agent is used at one and the same molar content in Compositions C1 and C2. This result is all the more noteworthy as this gain in hysteresis is also accompanied by an increase of 30% in the complex shear modulus G* at 23° C. at 50% strain. This compromise in properties of the rubber composition between the hysteresis and the stiffness in the cured state promises an improved compromise between the performances, such as the rolling resistance and the wear, in particular for a tire tread.

TABLE I

| Composition | C1 | C2 |
|---|---|---|
| Elastomer E1-g | 100 | — |
| Elastomer E2-g | — | 100 |
| Carbon black (1) | 3.00 | 3.00 |
| Silica (2) | 90.00 | 90.00 |
| Silane (3) | 7.20 | 7.20 |
| DPG (4) | 1.60 | 1.60 |
| Plasticizer | 31.50 | 31.50 |
| Antiozone wax | 1.65 | 1.65 |
| Antioxidant | 2.00 | 2.00 |
| Stearic acid | 2.00 | 2.00 |
| ZnO | 2.00 | 2.00 |
| Sulphur | 1.30 | 1.30 |
| Accelerator | 2.00 | 2.00 |

(1) N330
(2) Silica "Zeosil 1165 MP" Rhodia in the form of microbeads
(3) TESPT ("Si69" Degussa)
(4) Diphenylguanidine ("Perkacit DPG" from Flexsys)

TABLE II

| Properties in the cured state | C1 | C2 |
|---|---|---|
| $G^*_{(50\%)}$ (MPa) | 100 | 130 |
| $Tan\delta_{max}$ | 100 | 80 |

The invention claimed is:

1. A polymer which comprises the following units UA, UB, UC and UD and at least one unit bearing a subunit F,

UA)

—CH$_2$—CH$_2$—  according to a molar percentage of m%

UB)

—CH$_2$—R$_1$C═CR$_2$—CH$_2$— according to a molar percentage of n%

UC)

—CH$_2$—C(R$_1$)(C(═CH$_2$)—R$_2$)—  according to a molar percentage of o%

UD)

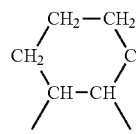 according to a molar percentage of p% which units UA, UB, UC and UD are distributed randomly within the polymer the subunit F being pendant along the chain of the polymer and bearing an associative group comprising at least one nitrogen atom, the unit bearing the subunit F being present in the polymer chain according to a molar percentage of f %, $R_1$ and $R_2$, which are identical or different, denoting a hydrogen atom, a methyl radical or a phenyl radical which is unsubstituted or substituted in the ortho, meta or para position by a methyl radical, $m \geq 50$
$n \geq 0$
$o \geq 0$
$f > 0$
$0 < o+p \leq 25$ m, n, o, p and f being numbers ranging from 0 to 100 the respective molar percentages of m, n, o, p and f being calculated on the basis of the sum of m+n+o+p+f, which is equal to 100, and which contains the following units UE distributed randomly within the polymer, UE)
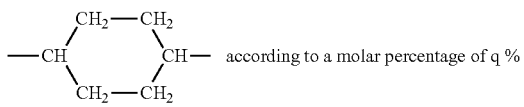 according to a molar percentage of q %

$o+p+q \leq 10$
$q \geq 0$ the respective molar percentages of m, n, o, p, q and f being calculated on the basis of the sum of m+n+o+p+q+f, which is equal to 100.

2. A polymer according to claim 1, which contains the following units UF distributed randomly within the polymer, UF)
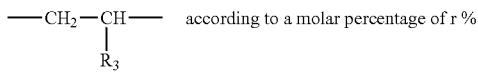 according to a molar percentage of r %

$R_3$ denoting an alkyl radical having from 1 to 4 carbon atoms or an aryl radical, $0 \leq r \leq 25$, the respective molar percentages of m, n, o, p, q, r and f being calculated on the basis of the sum of m+n+o+p+q+r+f, which is equal to 100.

3. A polymer according to claim 1, in which the percentages o is different from 0.

4. A polymer which comprises the following units UA, UB, UC and UD and at least one unit bearing a subunit F, UA)
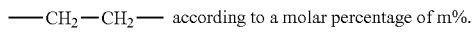 —CH$_2$—CH$_2$— according to a molar percentage of m%.

UB)
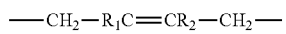 —CH$_2$—R$_1$C=CR$_2$—CH$_2$—
according to a molar percentage of n%.

UC)
 according to a molar percentage of o%.

UD)
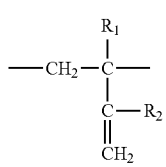 according to a molar percentage of p%.

which units UA, UB, UC and UD are distributed randomly within the polymer the subunit F being pendant along the chain of the polymer and bearing an associative group comprising at least one nitrogen atom, the unit bearing the subunit F being present in the polymer chain according to a molar percentage of f %, $R_1$ and $R_2$, which are identical or different, denoting a hydrogen atom, a methyl radical or a phenyl radical which is unsubstituted or substituted in the ortho, meta or para position by a methyl radical, $m \geq 50$
$n \geq 0$
$o \geq 0$
$f > 0$
$0 < o+p \leq 25$ m, n, o, p and f being numbers ranging from 0 to 100 the respective molar percentages of m, n, o, p and f being calculated on the basis of the sum of m+n+o+p+f, which is equal to 100, in which n and o are different from 0.

5. A polymer according to claim 1, in which at least one of the two molar percentages p and q is not equal to 0.

6. A polymer which comprises the following units UA, UB, UC and UD and at least one unit bearing a subunit F, UA) 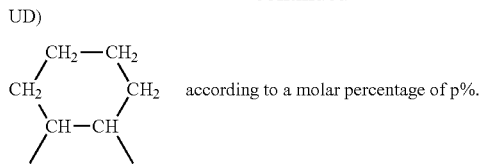 —CH$_2$—CH$_2$— according to a molar percentage of m %

UB) —CH$_2$—R$_1$C=CR$_2$—CH$_2$—
according to a molar percentage of n %

UC) 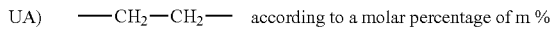 according to a molar percentage of o %

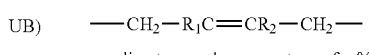

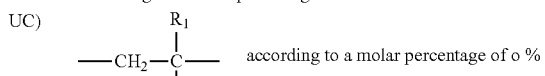

UD) 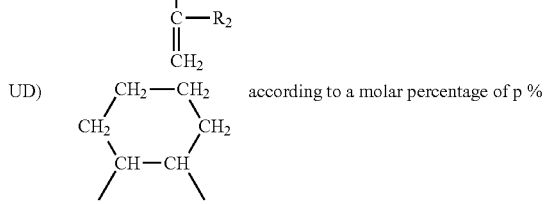 according to a molar percentage of p % which units UA, UB, UC and UD are distributed randomly within the polymer the subunit F being pendant along the chain of the polymer and bearing an associative group comprising at least one nitrogen atom, the unit bearing the subunit F being present in the polymer chain according to a molar percentage of f %, $R_1$ and $R_2$, which are identical or different, denoting a hydrogen atom, a methyl radical or a phenyl radical which is unsubstituted or substituted in the ortho, meta or para position by a methyl radical, $m \geq 50$
$n \geq 0$
$o \geq 0$
$f > 0$
$0 < o+p \leq 25$ m, n, o, p and f being numbers ranging from 0 to 100 the respective molar percentages of m, n, o, p and f being calculated on the basis of the sum of m+n+o+p+f, which is equal to 100, which contains, as monomer units, only the units UA, UB, UC, UD and UE and the units bearing the subunit F according to their respective molar percentages m, n, o, p, q and f.

7. A polymer according to claim 1, in which $R_1$ and $R_2$ are identical and denote a hydrogen atom.

8. A polymer according to claim 1, in which f varies from 0.01 to 50%.

9. A polymer according to claim 1, in which the associative group is selected from the group consisting of the imidazolidinyl, triazolyl, triazinyl, bis-ureyl and ureidopyrimidyl groups.

10. A polymer according to claim 1, in which the associative group corresponds to one of the following formulae (I) to (V):

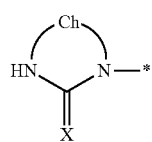
(I)

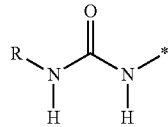
(II)

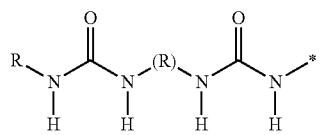
(III)

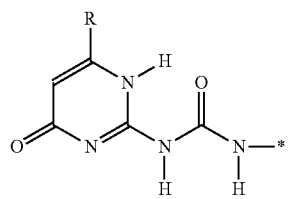
(IV)

-continued

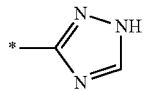
(V)

where:
Ch denotes a carbon chain which can optionally contain heteroatoms,
* represents a direct or indirect connection to the chain of the polymer,
R denotes a hydrocarbon group which can optionally contain heteroatoms,
X denotes an oxygen or sulphur atom or an NH group.

11. A polymer according to claim 1, in which the associative group corresponds to the formula (VI):

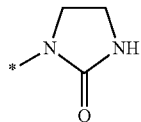
(VI)

where * represents a direct or indirect connection to the chain of the polymer.

12. A polymer according to claim 1, which is an elastomer.

13. A rubber composition which comprises a reinforcing filler and a polymer defined according to claim 12.

14. A tire which comprises a rubber composition according to claim 13.

* * * * *